United States Patent
Nagata et al.

(10) Patent No.: US 8,866,779 B2
(45) Date of Patent: Oct. 21, 2014

(54) DISPLAY DEVICE

(71) Applicant: Japan Display East Inc., Mobara (JP)

(72) Inventors: Koji Nagata, Hachioji (JP); Tsutomu Furuhashi, Yokohama (JP); Koji Doi, Chiba (JP); Shinji Sekiguchi, Kawasaki (JP)

(73) Assignee: Japan Display Inc., Tokyo (JP)

( * ) Notice: Subject to any disclaimer, the term of this patent is extended or adjusted under 35 U.S.C. 154(b) by 24 days.

(21) Appl. No.: 13/851,140

(22) Filed: Mar. 27, 2013

(65) Prior Publication Data

US 2013/0278564 A1 Oct. 24, 2013

(30) Foreign Application Priority Data

Apr. 18, 2012 (JP) ................................ 2012-094777

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01)
USPC ......................................... 345/173; 345/156

(58) Field of Classification Search
USPC ............ 345/156, 173–175; 178/18.01–18.07, 178/19.01–19.05
See application file for complete search history.

(56) References Cited

U.S. PATENT DOCUMENTS

| 5,526,701 | A  | * | 6/1996  | Tamori ..................... 73/862.046 |
| 2010/0265212 | A1 |   | 10/2010 | Sekiguchi et al. |
| 2012/0050229 | A1 | * | 3/2012  | Tenuta et al. .................. 345/178 |
| 2012/0154324 | A1 | * | 6/2012  | Wright et al. .................. 345/174 |
| 2013/0057504 | A1 | * | 3/2013  | Huang et al. ................... 345/174 |
| 2013/0201151 | A1 | * | 8/2013  | Takashima et al. ........... 345/174 |
| 2013/0221993 | A1 | * | 8/2013  | Ksondzyk et al. ............ 324/681 |
| 2013/0278516 | A1 | * | 10/2013 | Nagata et al. .................. 345/173 |
| 2013/0293491 | A1 | * | 11/2013 | Doi et al. ....................... 345/173 |
| 2013/0307823 | A1 | * | 11/2013 | Grivna et al. .................. 345/174 |

FOREIGN PATENT DOCUMENTS

JP 2010-256956 11/2010

* cited by examiner

*Primary Examiner* — Ricardo L Osorio
(74) *Attorney, Agent, or Firm* — Antonelli, Terry, Stout & Kraus, LLP.

(57) ABSTRACT

A display device includes a display panel and a touch panel built in the display panel. The touch panel includes a sensitivity correcting unit configured to correct the sensitivity of the touch panel. The sensitivity correcting unit includes a difference acquiring unit configured to acquire a signal difference (S1−S2) between a detection signal S1 acquired by detection electrodes when a driving signal V1 is input to scanning electrodes from a driving-signal supplying unit and a detection signal S2 (S1>S2) acquired by the detection electrodes when a driving signal V2 (V1>V2) different from the driving signal V1 is input to the scanning electrodes from the driving-signal supplying unit and a parameter changing unit configured to change parameters of at least one of the driving-signal supplying unit and a detecting unit when the signal difference (S1−S2) is equal to or smaller than a predetermined threshold.

10 Claims, 15 Drawing Sheets

Conventional Art

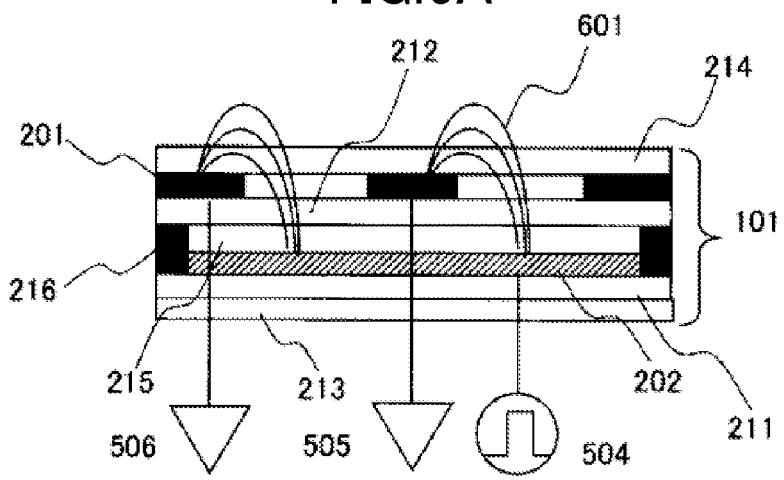
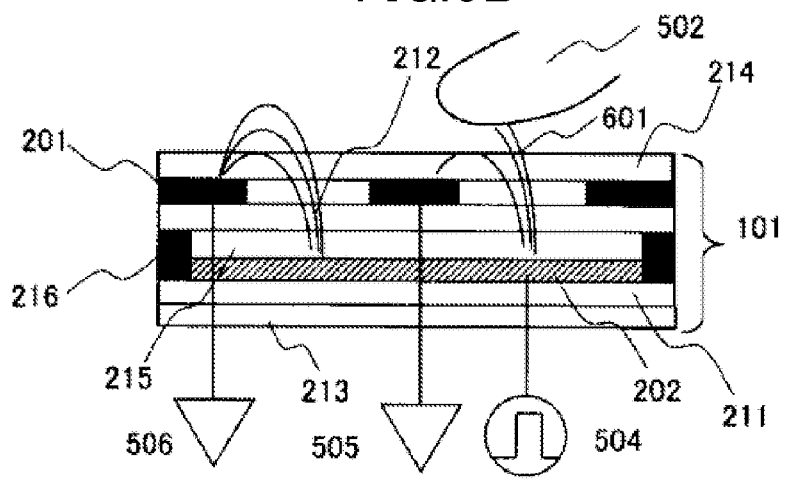
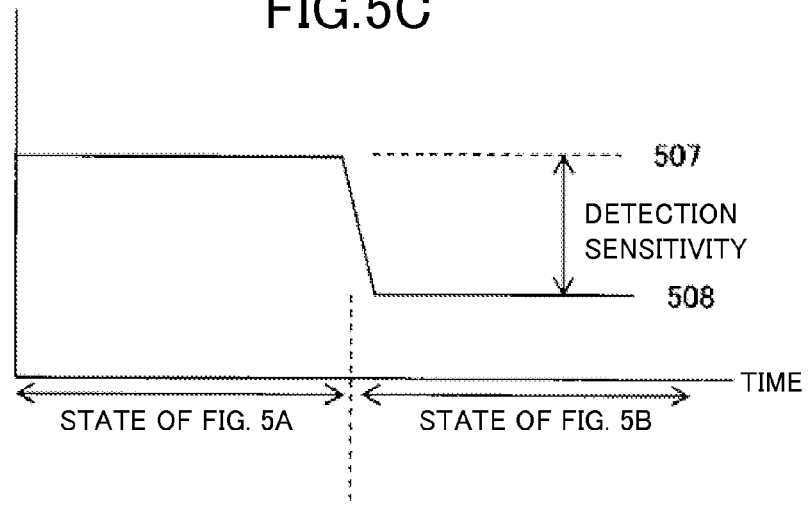

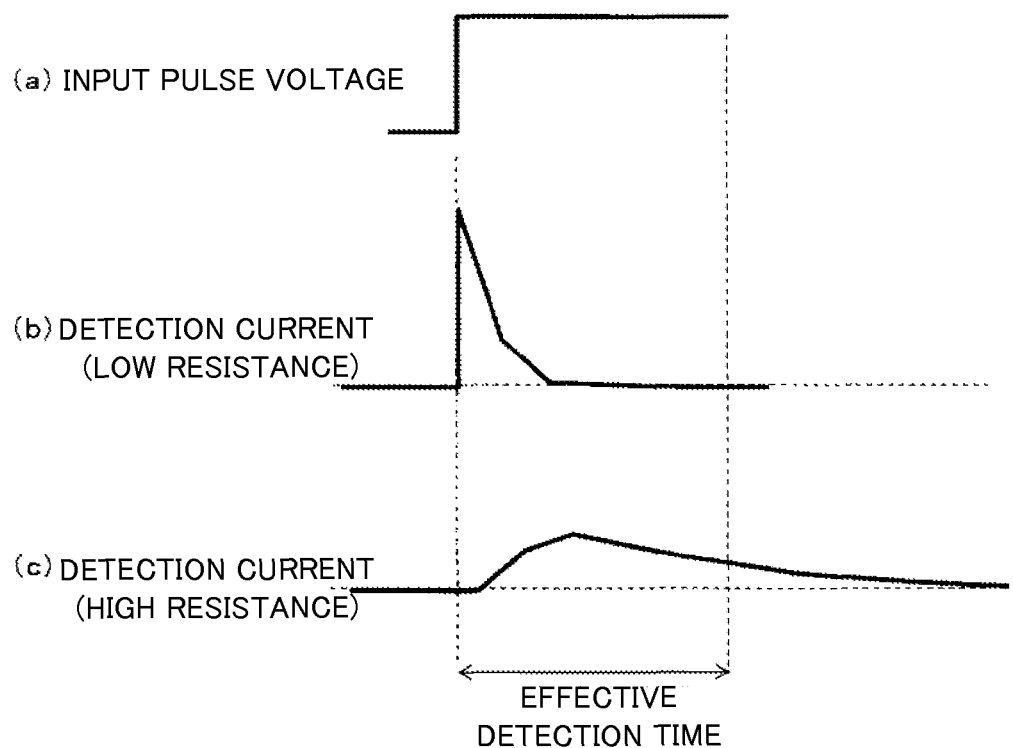

DISPLAY DEVICE

CROSS-REFERENCE TO RELATED APPLICATION

The present application claims priority from Japanese application JP2012-094777 filed on Apr. 18, 2012, the content of which is hereby incorporated by reference into this application.

BACKGROUND OF THE INVENTION

1. Field of the Invention

The present invention relates to a display device and, more particularly, to a technique effectively applied to a touch panel-integrated display device in which a touch panel function is incorporated in a liquid crystal display panel.

2. Description of the Related Art

A display device including a device referred to as a touch sensor or a touch panel for applying touch operation (contact and pressing operation, hereinafter simply referred to as touch) to a display screen using a finger of a user, a pen, or the like to input information is used for mobile electronic devices such as a PDA and a portable terminal, various household electric appliances, an automated teller machine, and the like. As such a touch panel, a resistance film type for detecting a resistance value change in a touched portion, a capacitance type for detecting a capacitance change, an optical sensor type for detecting a light amount change, and the like are known.

In the touch panel of the capacitance type, scanning electrodes (Y electrodes) for driving signal application arranged in a two-dimensional matrix shape lengthwise and crosswise and detection electrodes (X electrodes) for signal detection orthogonal to the scanning electrodes are provided. An input processing unit detects capacitances of the electrodes. When a conductor such as a finger comes into contact with the surface of the touch panel, the capacitances of the electrodes increase. Therefore, the input processing unit detects the increase in the capacitances and calculates an input coordinate on the basis of signals of capacitance changes detected by the electrodes.

SUMMARY OF THE INVENTION

For example, in a touch panel-integrated display device in which a touch panel is built in a display panel, detection sensitivity is deteriorated according to aged deterioration of detection electrodes.

The invention has been devised in order to solve the problem of the related art and it is an object of the invention to provide a technique for making it possible to suppress the deterioration in the detection sensitivity involved in the aged deterioration of the detection electrodes in the touch panel-integrated display device.

The abovementioned object and other objects and new characteristics of the invention are made apparent by the description of this specification and the accompanying drawings.

Overviews of representative inventions among inventions disclosed in this application are briefly explained below.

(1) A display device including a display panel and a touch panel built in the display panel, wherein the touch panel includes a plurality of scanning electrodes formed on the display panel, a plurality of detection electrodes formed on the display panel and crossing the plurality of scanning electrodes, a driving-signal supplying unit configured to input a driving signal to the scanning electrodes when a touch position detection is performed, a detecting unit configured to acquire detection signals from the detection electrodes when the driving signal is input to the scanning electrodes from the driving-signal supplying unit, and a sensitivity correcting unit configured to correct the sensitivity of the touch panel, and the sensitivity correcting unit includes a difference acquiring unit configured to acquire a signal difference (S1−S2) between a detection signal S1 acquired by the detection electrodes when a driving signal V1 is input to the scanning electrodes from the driving-signal supplying unit and a detection signal S2 (S1>S2) acquired by the detection electrodes when a driving signal V2 (V1>V2) different from the driving signal V1 is input to the scanning electrodes from the driving-signal supplying unit and a parameter changing unit configured to change parameters of at least one of the driving-signal supplying unit and the detecting unit when the signal difference (S1−S2) is equal to or smaller than a predetermined threshold D.

(2) In (1), the parameter changing unit increases a voltage value of the driving signal input to the scanning electrodes from the driving-signal supplying unit when the touch position detection is performed.

(3) In (1), the parameter changing unit increases a detection time in which the detecting unit acquires the detection signals from the detection electrodes when the touch position detection is performed.

(4) In (1), when the touch position detection is performed, the driving-signal supplying unit inputs the driving signals to the scanning electrodes a plurality of times, and the parameter changing unit increases the number of times of input of the driving signals input to the scanning electrodes from the driving-signal supplying unit.

(5) In (1), when the touch position detection is performed, the detecting unit accumulates a detection signal based on respective driving signals input to the scanning electrodes a plurality of times, and the parameter changing unit increases the number of times of the integration by the detecting unit according to the number of times of the driving signals input to the scanning electrodes.

(6) In (1), the correction of the sensitivity of the touch panel by the sensitivity correcting unit is periodically executed.

An effect obtained by the representative inventions among the inventions disclosed in this application is briefly explained below.

According to the invention, it is possible to suppress the deterioration in the detection sensitivity involved in the aged deterioration of the detection electrodes in the touch panel-integrated display device.

BRIEF DESCRIPTION OF THE DRAWINGS

FIGS. 5A, 5B, and 5C are diagrams for explaining a detection principle of a touch panel-integrated liquid crystal display device having a structure shown in FIGS. 4A and 4B;

FIG. 7 is a diagram for explaining a reason why the detection sensitivity falls when the resistance value of the sensor electrodes increases in the touch panel of the capacitance type;

DETAILED DESCRIPTION OF THE INVENTION

Figure 1A:
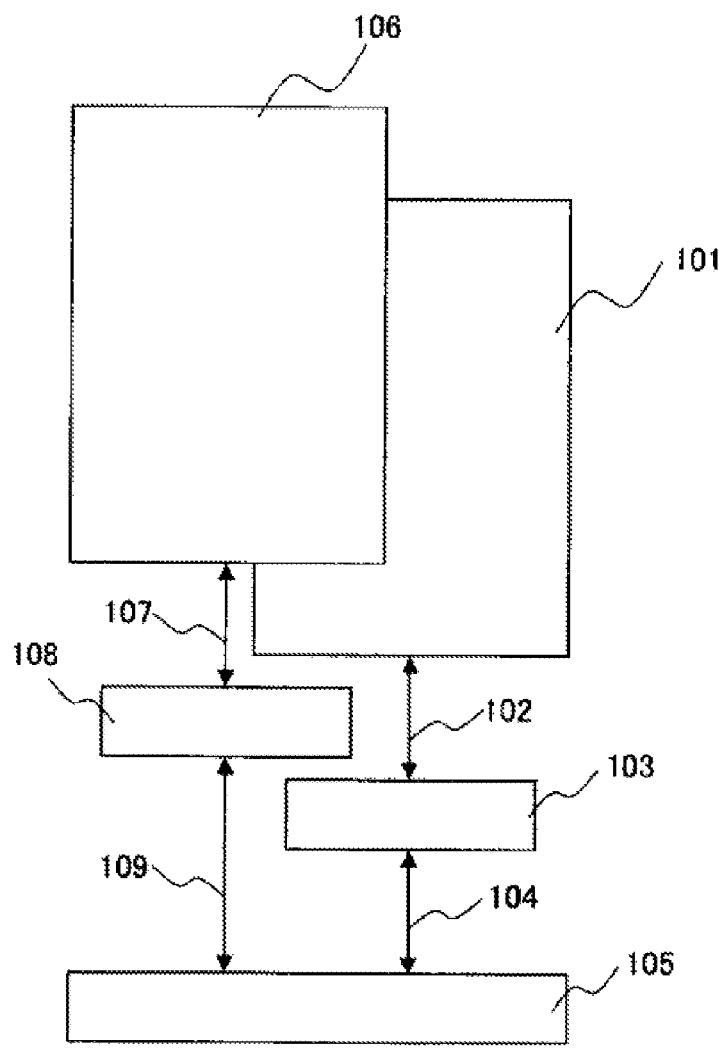
FIGS. 1A and 1B are diagrams for explaining a conventional touch panel-equipped display device.

An embodiment of the invention is explained in detail below with reference to the drawings.

In all the figures for explaining the embodiment, components having the same functions are denoted by the same reference numerals and signs and repeated explanation of the components is omitted. The embodiment explained below is not intended to limit the interpretation of the scope of the claims of the invention. Overview of a conventional touch panel FIGS. 1A and 1B are diagrams for explaining a conventional touch panel-equipped display device.

FIG. 1A is a block diagram showing a schematic configuration of the conventional touch panel-equipped display device. FIG. 1B is a diagram showing the structure of the conventional touch panel-equipped display device.

Figure 1B:
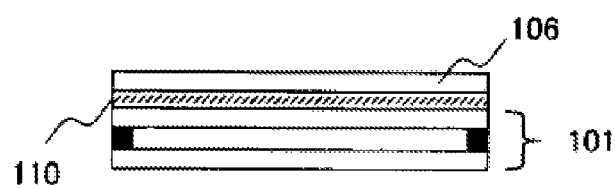

In the touch panel-equipped display device shown in FIGS. 1A and 1B, as shown in FIG. 1B, a touch panel 106 of a capacitance type is bonded on a display panel (a liquid crystal display panel) 101 by an adhesive 110. As explained below, the touch panel 106 includes Y electrodes (scanning electrodes) for driving signal application and X electrodes (detection electrodes) for signal detection orthogonal to the Y electrodes.

The touch panel 106 is set on the front surface of the display panel 101. Therefore, when a user views an image displayed on the display panel 101, a display image needs to be transmitted through the touch panel 106. Therefore, the touch panel 106 desirably has high light transmittance.

The X electrodes and the Y electrodes of the touch panel 106 are connected to a touch-panel control unit 108 by a wire 107.

The touch-panel control unit 108 sequentially applies a driving signal using the Y electrodes as scanning electrodes and uses the X electrodes as detection electrodes to measure inter-electrode capacitances at electrode intersections and calculates an input coordinate from capacitance detection signals that change according to capacitance values at the intersections among the electrodes.

The touch-panel control unit 108 transfers the input coordinate to a system control unit 105 using an I/F signal 109.

When the input coordinate is transferred from the touch panel 106 by touch operation, the system control unit 105 generates a display image corresponding to the touch operation and transfers the display image to a display control circuit 103 as a display control signal 104.

The display control circuit 103 generates a display signal 102 according to the display image transferred by the display control signal 104 and displays an image on the display panel 101.

The display panel 101 only has to be a display panel in which the touch panel 106 can be used. The display panel 101 is not limited to a liquid crystal display panel. A display panel including an organic light-emitting diode device or a surface conduction electron-emitting device, an organic EL display panel, and the like can also be used.

Figure 2A:
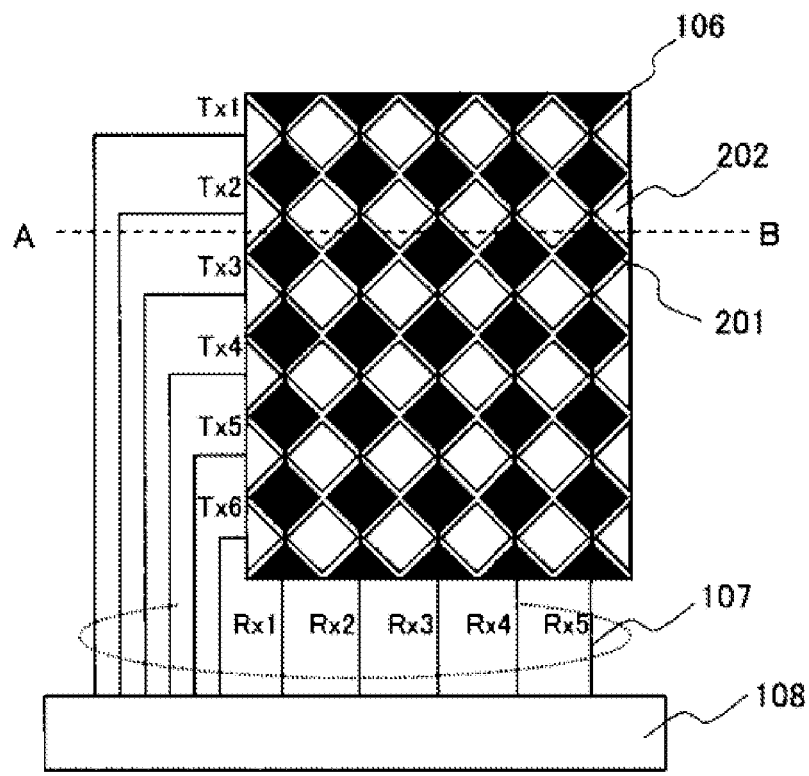
FIGS. 2A and 2B are diagrams for explaining a touch panel shown in FIGS. 1A and 1B.
Figure 2B:
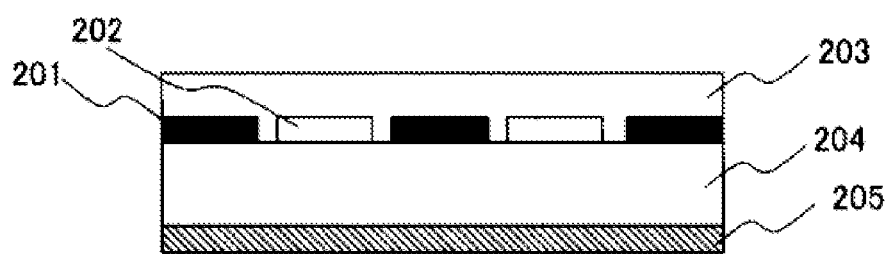

FIGS. 2A and 2B are diagrams for explaining the touch panel 106 shown in FIGS. 1A and 1B.

FIG. 2A is a diagram showing an electrode pattern of the touch panel 106 shown in FIGS. 1A and 1B. FIG. 2B is a sectional view showing a sectional structure taken along cut line A-B shown in FIG. 2A.

As shown in FIG. 2A, the touch panel 106 shown in FIGS. 1A and 1B includes X electrodes 201 for capacitance detection and Y electrodes 202. In the figure, for example, five X electrodes 201 and six Y electrodes 202 are shown. However, the numbers of the electrodes are not limited to these numbers.

In FIG. 2B, reference numeral 204 denotes a touch panel substrate configured by a glass substrate, a PET film, and the like. In the touch panel 106 shown in FIGS. 1A and 1B, the X electrodes 201 and the Y electrodes 202 are formed on the touch panel substrate 204. A protective film 203 is formed on the X electrodes 201 and the Y electrodes 202. In FIG. 2B, a shield electrode 205 is formed on a surface of the touch panel substrate 204 on the display panel side.

Figure 2C:
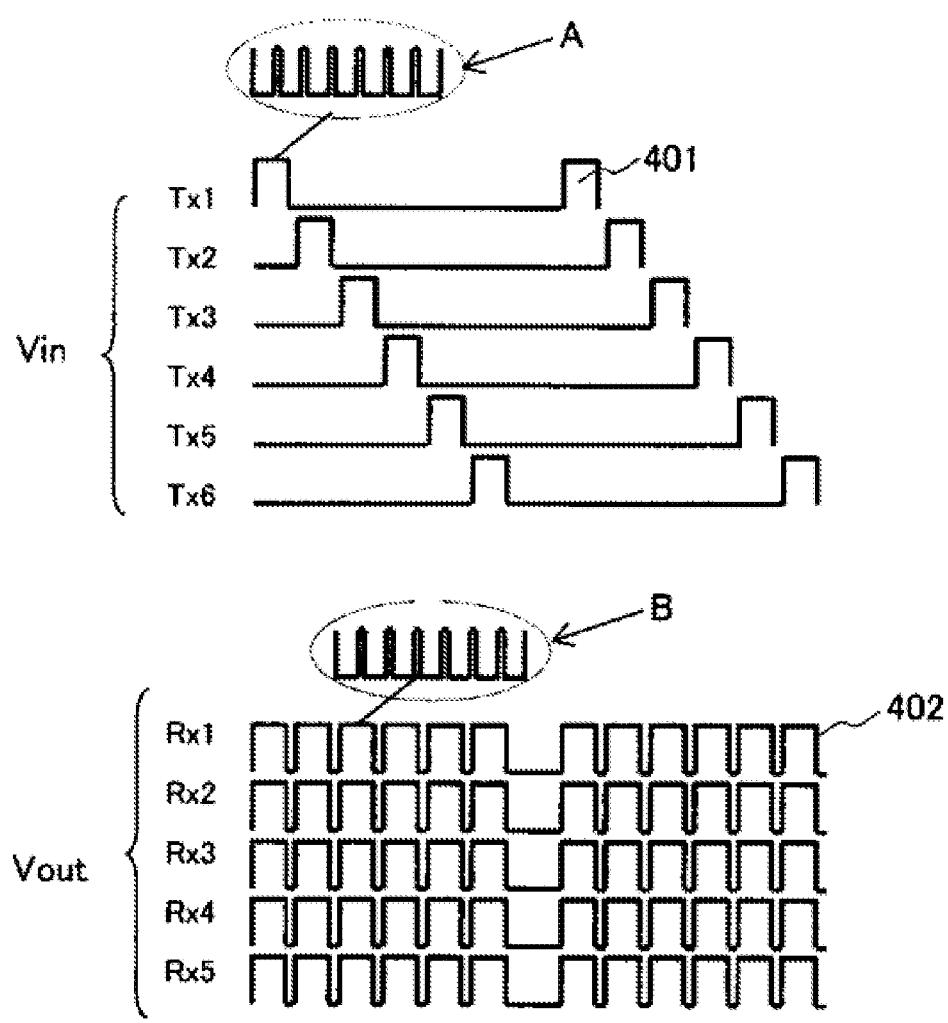
FIG. 2C is a diagram for explaining a detection procedure of the touch panel shown in FIGS. 1A and 1B.

FIG. 2C is a diagram for explaining a detection procedure of the touch panel 106 shown in FIGS. 1A and 1B and is a diagram for explaining a detection procedure performed when there is no input to the touch panel 106. FIG. 2C is a waveform chart. In the waveform chart of FIG. 2C, the abscissa indicates time and the ordinate indicates amplitude.

As shown in FIG. 2C, a driving voltage (a driving pulse) 401 is sequentially input to the Y electrodes 202 of TX1 to TX6 in every one scanning period. On the other hand, a waveform of a detection signal 402 detected by the X electrodes 201 of RX1 to RX5 changes in synchronization with the input of the driving voltage 401. In FIG. 2C, since there is no input to the touch panel 106, a large change does not occur in the amplitude of the detection signal 402 detected by the X electrodes 201 of RX1 to RX5.

As shown in A in FIG. 2C, the driving signal (the input pulse) 401 sequentially input to the Y electrodes 202 of TX1 to TX6 in every one detection period is a plurality of pulse trains. Similarly, as shown in B in FIG. 2C, the detection signal 402 detected by the X electrodes 201 of RX1 to RX5 is also a plurality of pulse trains.

Figure 3A:
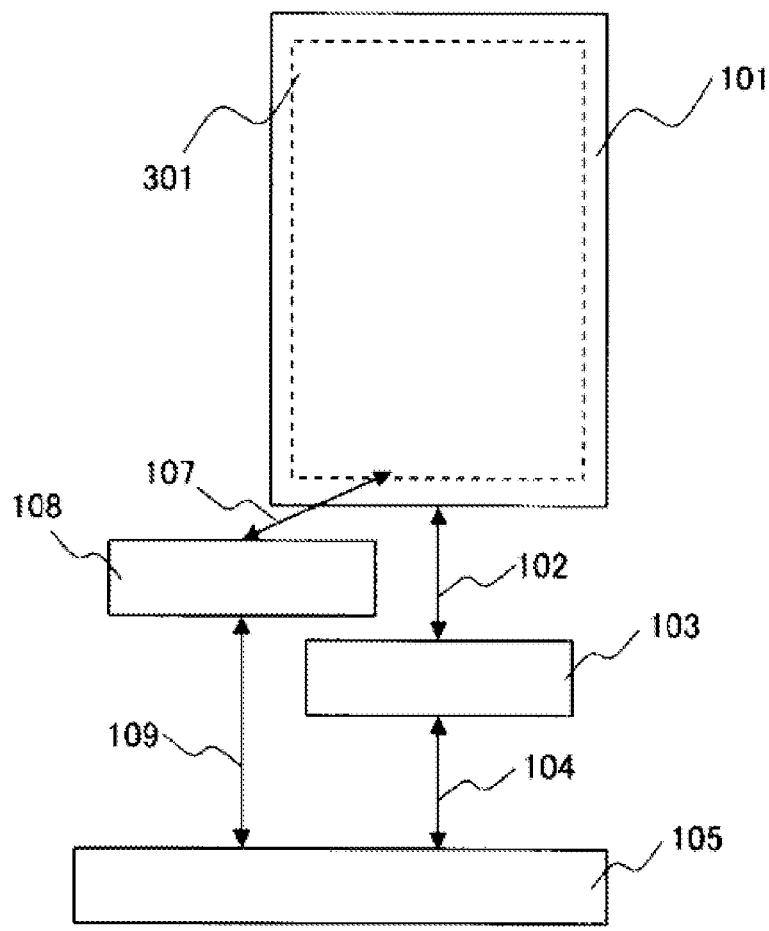
FIGS. 3A and 3B are diagrams for explaining a conventional touch panel-integrated display device.
Figure 3B:
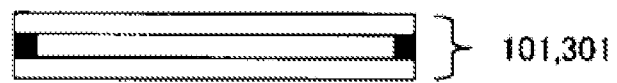

FIGS. 3A and 3B are diagrams for explaining a conventional touch panel-integrated display device.

FIG. 3A is a block diagram showing a schematic configuration of the conventional touch panel-integrated display device. FIG. 3B is a diagram showing a sectional structure of the conventional touch panel-integrated display device.

In the touch panel-integrated display device shown in FIGS. 3A and 3B, as shown in FIG. 3B, a touch panel 301 of a capacitance type is formed on the inside of the display device (here, the liquid crystal display panel) 101. Otherwise, the configuration of the touch panel 301 is the same as the configuration of the touch panel 106 shown in FIG. 1A. Therefore, redundant detailed explanation of the configuration is omitted.

Figure 4A:
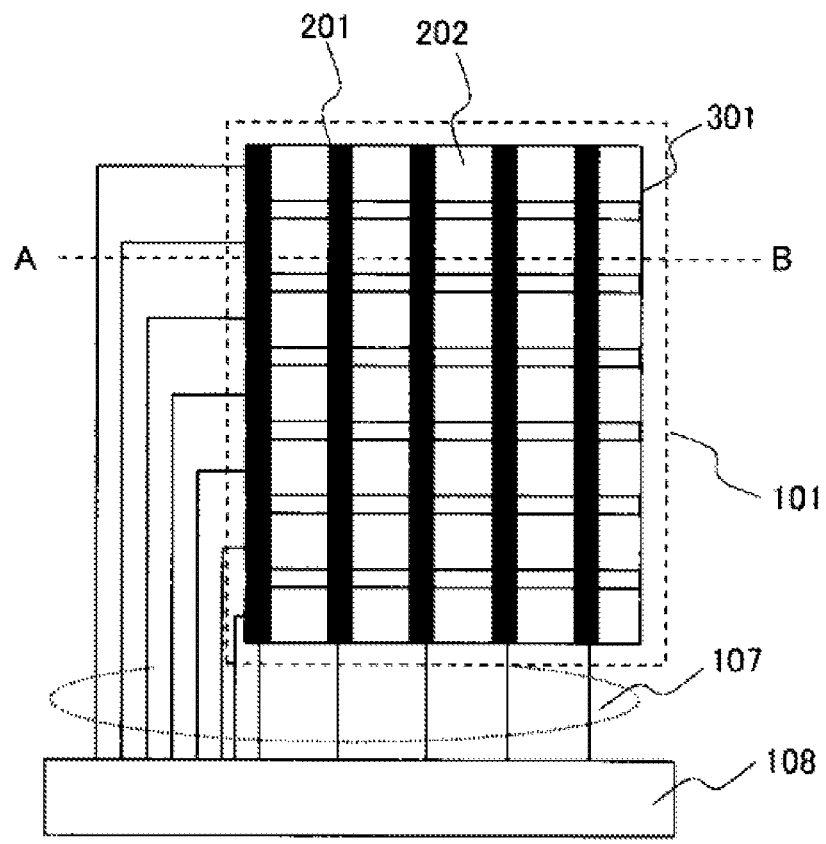
FIGS. 4A and 4B are diagrams for explaining a touch panel shown in FIGS. 3A and 3B.
Figure 4B:
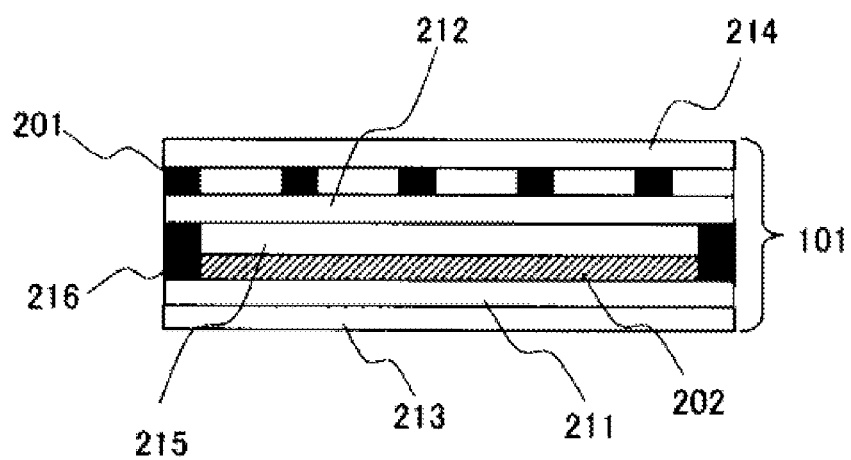

FIGS. 4A and 4B are diagrams for explaining the touch panel 301 shown in FIGS. 3A and 3B. FIG. 4A is a diagram showing an electrode pattern of the touch panel 301 shown in FIGS. 3A and 3B. FIG. 4B is a sectional view showing a sectional structure taken along cut line A-B shown in FIG. 4A.

As shown in FIG. 4A, the touch panel 301 shown in FIGS. 3A *and* 3B includes the X electrodes 201 for capacitance detection and the Y electrodes 202. In the figure, for example, five X electrodes 201 and seven Y electrodes 202 are shown. However, the numbers of the electrodes are not limited to these numbers.

In FIG. 4B, reference numeral 211 denotes a first substrate, 212 denotes a second substrate, 213 denotes a lower sheet polarizer, 214 denotes an upper sheet polarizer, 215 denotes a liquid crystal layer, and 216 denotes a seal material. As shown in FIG. 4B, the X electrodes 201 and the Y electrodes 202 are formed in different regions of a structure member of the liquid crystal display panel 101. The first substrate 211 and the second substrate 212 desirably have high light transmittance.

In general, in a liquid crystal display panel of an IPS type, on a surface of the first substrate 211 on the liquid crystal layer side, scanning lines (referred to as gate lines as well), an interlayer insulating film, video lines (referred to as source lines or drain lines as well) and thin film transistors (TFTs), pixel electrodes, an interlayer insulating film, counter electrodes (referred to as common electrodes as well), and an oriented film are formed in order from the first substrate 211 toward the liquid crystal layer 215. However, in FIG. 4B, these components are not shown.

On the liquid crystal layer side of the second substrate 212, a light blocking film, red, green, and blue color filters, a planarizing film, and an oriented film are formed in order from the second substrate 212 toward the liquid crystal layer 215. However, in FIG. 4B, these components are not shown.

In the structure shown in FIG. 4B, rear surface electrodes formed on a surface of the second substrate 212 on the opposite side of the liquid crystal layer 215 function as the X electrodes 201 as well and the counter electrodes function as the Y electrodes 202 as well.

FIGS. 5A, 5B, and 5C are diagrams for explaining a detection principle of the touch panel-integrated liquid crystal display device having the structure shown in FIGS. 4A and 4B.

FIG. 5A is a diagram showing a state in which touch operation is not performed. FIG. 5B is a diagram showing a state in which a finger 502 is brought close to the touch panel 106. FIG. 5C is a graph showing a change in a detected signal.

As shown in FIGS. 5A, 5B, and 5C, a voltage source 504 is connected to one of the X electrodes 201 and the Y electrodes 202 (in the figures, connected to the Y electrodes 202). A pulse (a driving signal) is input to one of the X electrodes 201 and the Y electrodes 202 from the voltage source 504. A transient current involved in the input pulse from the voltage source 504 is detected by detecting circuits (505 and 506) through the other electrodes (in the figures, the X electrodes 201) capacitively coupled to the one electrodes. As shown in FIG. 5A, the capacitive coupling forms lines of electric force 601 between the X electrodes 201 and the Y electrodes 202.

As shown in FIG. 5B, when the finger 502 is brought close to the touch panel 106, the lines of electric force 601 are blocked. Consequently, the transient current decreases.

As shown in FIG. 5C, when the finger 502 or the like closely contacts with the touch panel 106, a detection signal level detected by the detecting circuits (505 and 506) changes from a detection signal level 507 before the contact shown in FIG. 5A to a detection signal level 508 after the contact shown in FIG. 5B. A difference between the detection signal level 507 and the detection signal level 508 is detection sensitivity.

As shown in B in FIG. 2C, the detection signal detected by the X electrodes 201 is a plurality of pulse trains. Therefore, the detecting circuits (505 and 506) accumulate the detection signal of the plurality of pulse trains, specifically, integrate the detection signal using integrating circuits, and detect signals of the detection signal level 507 and the detection signal level 508.

Figure 6:
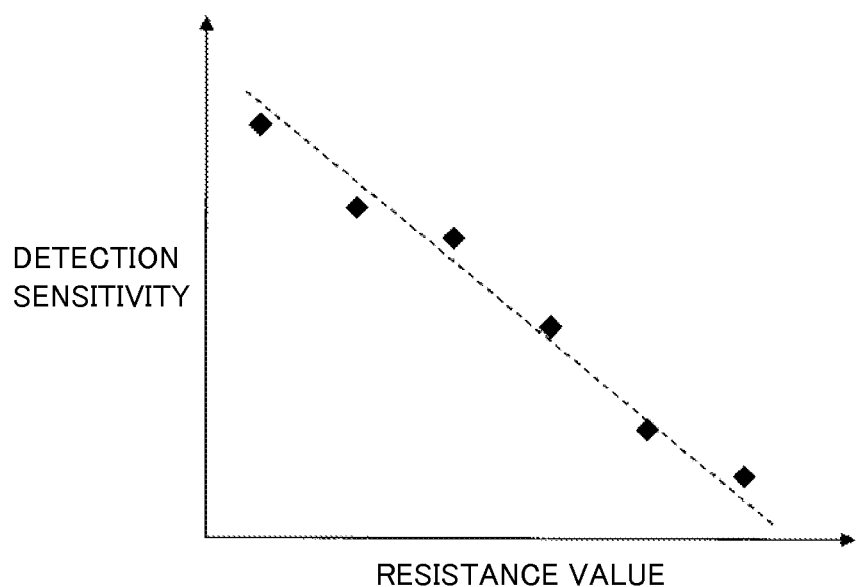
FIG. 6 is a diagram for explaining a relation between a resistance value of sensor electrodes and detection sensitivity in a touch panel of a capacitance type.

FIG. 6 is a diagram explaining a relation between a resistance value of sensor electrodes (the X electrodes 201 shown in FIGS. 4A and 4B) and detection sensitivity in a touch panel of a capacitance type.

As shown in FIG. 6, the detection sensitivity falls when the resistance value of the sensor electrodes (the X electrodes 201 shown in FIGS. 4A and 4B) increases.

FIGS. 7A to 7C are diagrams for explaining a reason why the detection sensitivity falls when the resistance value of the sensor electrodes (the X electrodes 201 shown in FIGS. 4A and 4B) increases in the touch panel of the capacitance type.

An input pulse voltage a shown in FIG. 7A indicates a waveform of a driving signal input to scanning electrodes (the Y electrodes 202 shown in FIGS. 4A and 4B). As shown in FIG. 7A, a predetermined period from a rising edge of the driving signal is an effective detection time.

Detected currents b and c shown in FIGS. 7B and 7C indicate waveforms of electric currents flowing to the sensor electrodes (the X electrodes 201 shown in FIGS. 4A and 4B) according to the input of the input pulse voltage a to the scanning electrodes (the Y electrodes 202 shown in FIGS. 4A and 4B).

As shown in FIG. 7B, when the resistance value of the sensor electrodes (the X electrodes 201 shown in FIGS. 4A and 4B) are in a state of low resistance, an electric current having a steep characteristic flows at the rising edge of the input pulse voltage a. The electric current finishes flowing within the effective detection time.

On the other hand, as shown in FIG. 7C, when the sensor electrodes (the X electrodes 201 shown in FIGS. 4A and 4B) are in a high-resistance state, an electric current flowing to the sensor electrodes has a gently rising characteristic. The electric current does not finish flowing within the effective detection time. Therefore, a difference occurs between total amounts of electric currents detected when the resistance value of the sensor electrode is low resistance and when the resistance value is high resistance. The difference is a sensitivity fall.

Figure 8A:
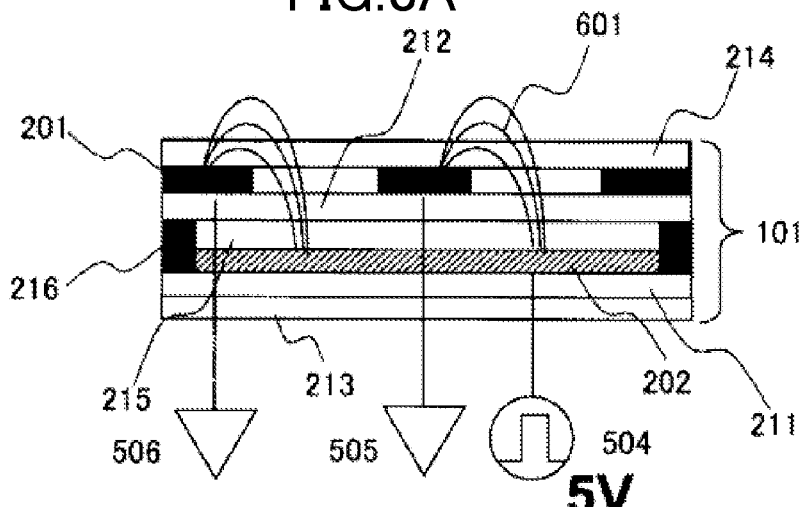
FIGS. 8A, 8B, and 8C are diagrams for explaining a level difference of a detection signal due to the amplitude of a driving signal in the touch panel of the capacitance type.
Figure 8B:
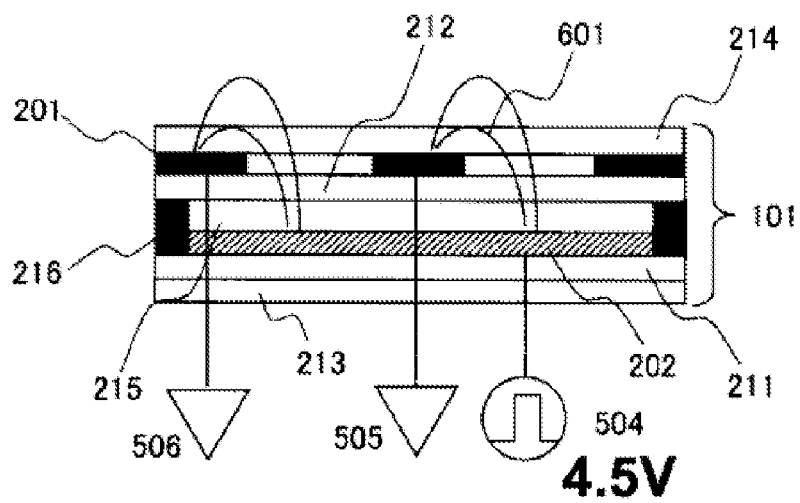
Figure 8C:
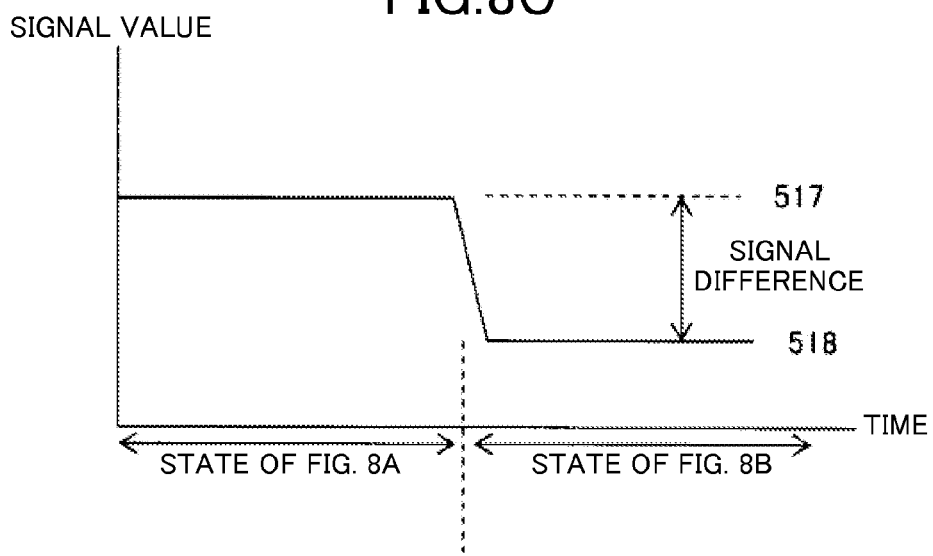

FIGS. 8A, 8B, and 8C are diagrams for explaining a level difference of a detection signal due to the amplitude of a driving signal in the touch panel of the capacitance type.

FIG. 8A is a diagram showing a state in which a driving signal having amplitude of 5 V is input to the Y electrodes 202 from the voltage source 504 in the touch panel shown in FIGS. 4A and 4B.

The lines of electric force 601 are formed between the Y electrodes 202 and the X electrodes 201. An electric current transiently flows along the lines of electric force 601. The electric current is measured by the detecting circuits (505 and 506) respectively provided in the X electrodes 201.

FIG. 8B is a diagram showing a state in which a driving signal having amplitude of 4.5 V is input to the Y electrodes 202 from the voltage source 504 in the touch panel shown in FIGS. 4A and 4B.

As in FIG. 8A, the lines of electric force 601 are formed between the Y electrodes 202 and the X electrodes 201. However, since the amplitude of the driving signal is small, the density of the formed lines of electric force 601 is low. As a result, when the amplitude of the driving signal is changed, a detection signal level changes from a detection signal level 517 in the case of the amplitude 5 V of the driving signal to a detection signal level 518 in the case of the amplitude 4.5 V of the driving signal. A difference between the levels is defined as a signal difference.

Figure 9A:
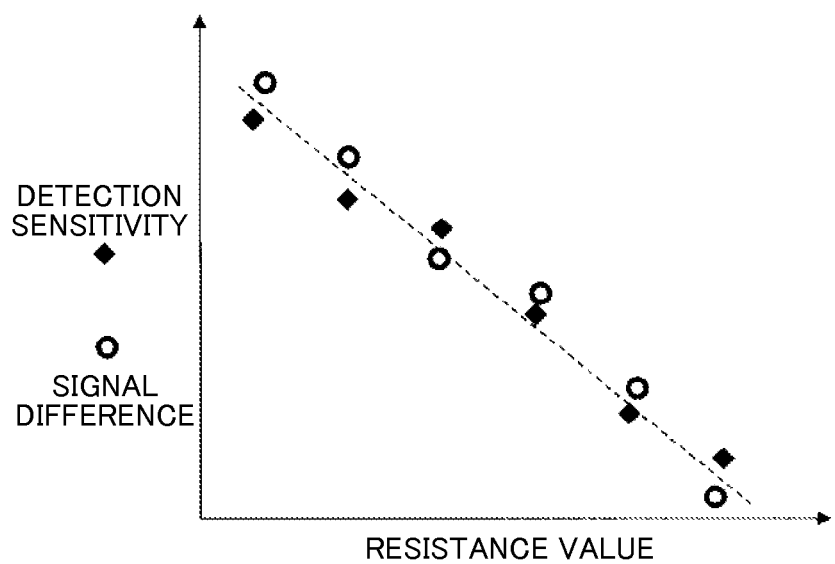
FIGS. 9A and 9B are diagrams for explaining a relation between a signal difference shown in FIG. 8C and the detection sensitivity and the resistance value of the sensor electrodes.
Figure 9B:
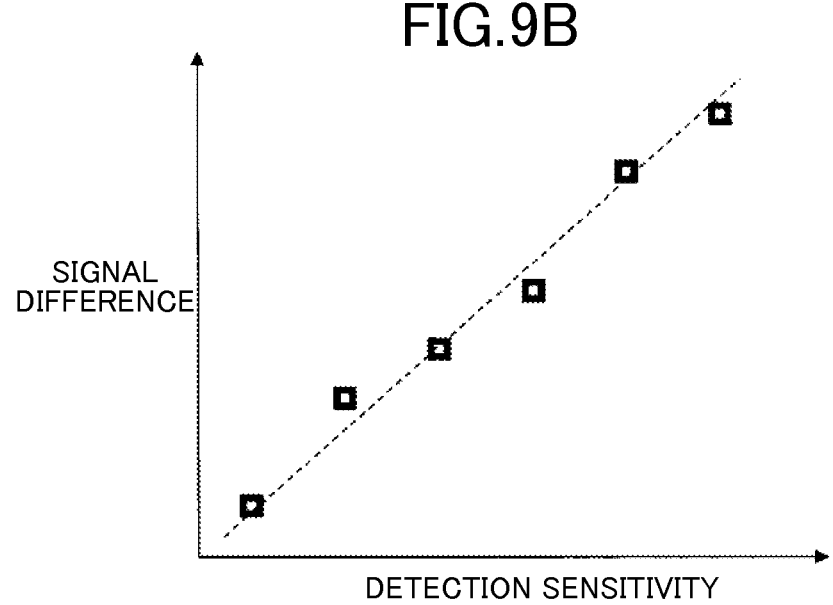

FIGS. 9A and 9B are diagrams for explaining a relation between the signal difference shown in FIGS. 8A, 8B, and 8C and the detection sensitivity and the resistance value of the sensor electrodes (the X electrodes 201 shown in FIGS. 4A and 4B).

As shown in FIG. 9A, like the detection sensitivity, the signal difference shown in FIGS. 8A, 8B, and 8C has dependency on the resistance value of the sensor electrodes (the X electrodes 201 shown in FIGS. 4A and 4B).

As shown in FIG. 9B, there is a high correlation between the signal difference shown in FIGS. 8A, 8B, and 8C and the detection sensitivity. The detection sensitivity can be estimated from the signal difference shown in FIGS. 8A, 8B, and 8C.

Characteristics of the Touch Panel in this Embodiment

Figure 10:
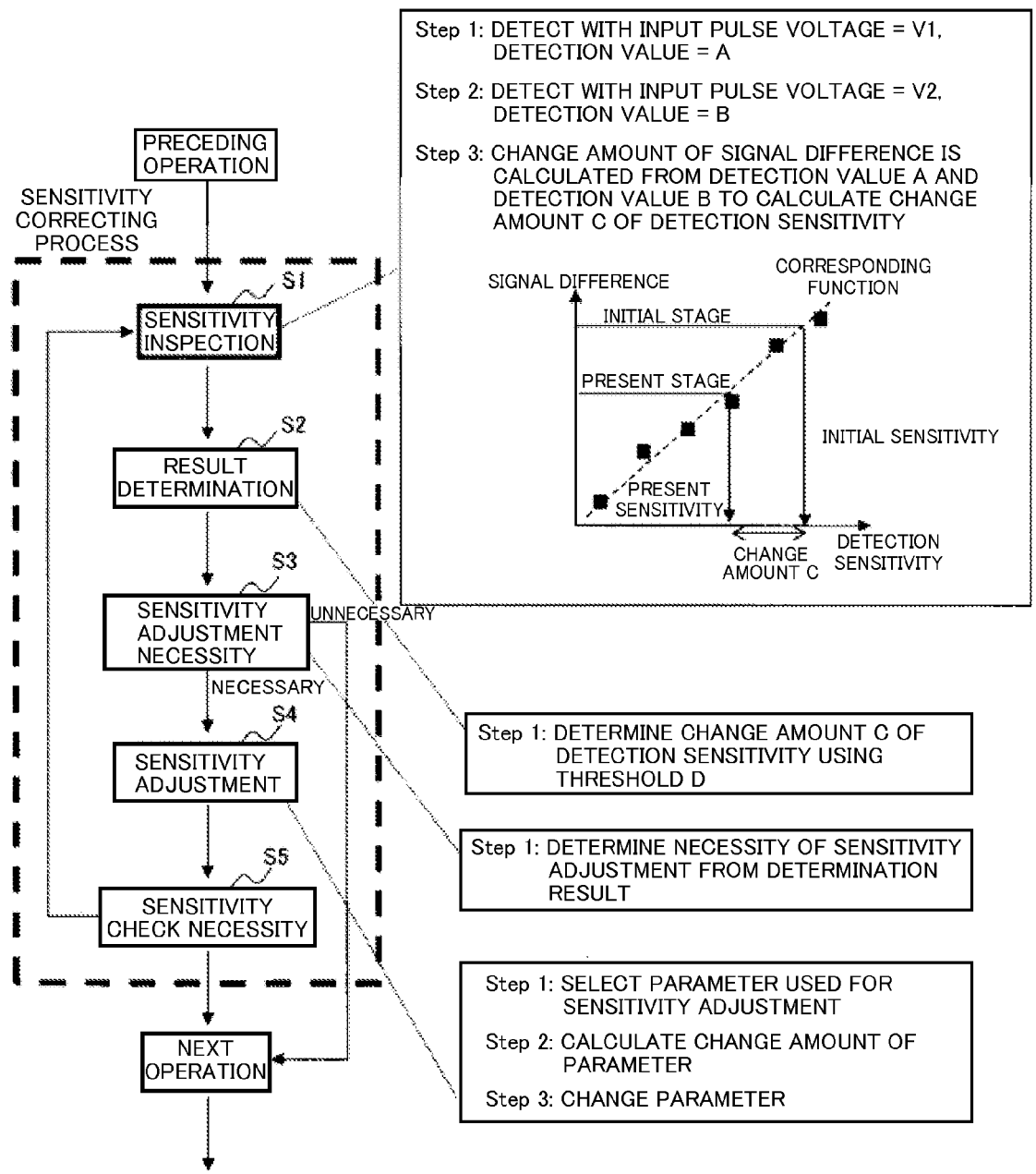
FIG. 10 is a diagram for explaining a sensitivity correcting method in an embodiment of the invention.

FIG. 10 is a diagram for explaining a sensitivity correcting method in the embodiment of the invention.

As shown in FIG. 10, a sensitivity correcting process in this embodiment (a thick broken line portion in FIG. 10) includes a sensitivity inspecting step in step S1, a result determining step in step S2, a sensitivity adjustment necessity determining step in step S3, a sensitivity adjusting step in step S4, and a sensitivity check necessity determining step in step S5.

The sensitivity inspecting step in step S1 shown in FIG. 10 roughly includes three steps explained below.

In Step 1, the amplitude of a driving signal is set to V1 to perform detection. As a result, a detection value A is obtained.

In Step 2, the amplitude of the driving signal is set to V2 to perform detection. As a result, a detection value B is obtained. Different values are set for the amplitude V1 and the amplitude V2 so that the voltage difference (V1−V2) might be constant.

In Step 3, a signal difference, which is a difference between the detection value A and the detection value B, is calculated.

The signal difference is the signal difference explained with reference to FIGS. 8A, 8B, and 8C. Detection sensitivity can be estimated from the signal difference. As a result, a value C is obtained as an amount of change in the detection sensitivity at the present point with respect to sensitivity in an initial state.

In the result determining step in step S2, the value C is evaluated.

In FIG. 10, a determination threshold D is provided for the sensitivity change amount. Comparison between the value C and the determination threshold D is evaluated.

In the sensitivity adjustment necessity determining step in step S3, a sensitivity-adjustment-necessity determining unit determines from a result of the result determining step in step S2 whether sensitivity adjustment is necessary.

When it is determined that the sensitivity adjustment is unnecessary, the sensitivity correcting process ends and shifts to the next operation. When the sensitivity adjustment is necessary, the sensitivity correcting process shifts to the sensitivity adjusting step in step S4 and sensitivity adjustment is carried out.

In FIG. 10, the sensitivity adjusting step in step S4 includes three steps explained below.

In Step 1, a parameter to be changed when the sensitivity adjustment is carried out is selected. The parameter is different for each configuration of the detecting circuits (505 and 506). However, in view of the object of the invention, it is evident that the parameter is not limited to a peculiar parameter.

For example, as the parameter, there are (1) a method of increasing a voltage value of a driving signal input to the scanning electrodes (the Y electrodes 202 shown in FIGS. 4A and 4B) when a touch position detection is performed, (2) a method of increasing the effective detection time shown in FIGS. 7A to 7C, and (3) a method of increasing the number of times of input of a driving signal to the scanning electrodes (the Y electrodes 202 shown in FIGS. 4A and 4B) when the touch position detection is performed.

In Step 2, a change amount of the parameter is calculated.

In Step 3, the parameter is changed.

Thereafter, sensitivity check necessity determination in step S5 is performed. When a sensitivity check is necessary, the sensitivity check is carried out and sensitivity is checked. When the sensitivity check is unnecessary, the sensitivity correcting process ends and shifts to the next operation.

Figure 11:
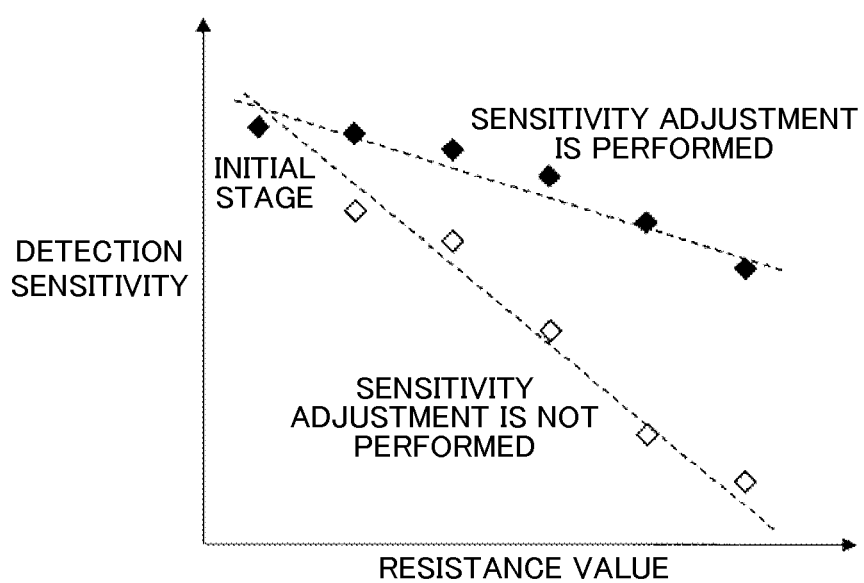
FIG. 11 is a diagram for explaining a relation between the resistance value of the sensor electrodes and the detection sensitivity in the case in which the sensitivity correcting method in the embodiment of the invention is applied and the case in which the sensitivity correcting method in the embodiment of the invention is not applied.

In FIG. 11, a relation between the resistance value of the sensor electrodes (the X electrodes 201 shown in FIGS. 4A and 4B) and the detection sensitivity is shown in the case in which the sensitivity correcting method in the embodiment of the invention is applied and the case in which the sensitivity correcting method in the embodiment of the invention is not applied.

As it is seen from FIG. 11, when the sensitivity correcting method in this embodiment is applied, it is possible to suppress deterioration in the detection sensitivity involved in aged deterioration of the resistance value of the sensor electrodes (the X electrodes 201 shown in FIGS. 4A and 4B).

The signal difference shown in FIG. 8C is detected for each of the sensor electrodes (the X electrodes 201 shown in FIGS. 4A *and* 4B). Therefore, the sensitivity adjustment executed in step S4 shown in FIG. 10 may be set for each of the sensor electrodes. Alternatively, when the sensitivity adjustment for one sensor electrode among a plurality of sensor electrodes is necessary or when the sensitivity adjustment for the majority of the sensor electrodes among the plurality of sensor electrodes is necessary, the sensitivity adjustment may be executed for all the sensor electrodes.

As explained above, according to this embodiment, it is possible to estimate a resistance value change of the sensor electrodes (the X electrodes 201 shown in FIGS. 4A and 4B) using the signal difference obtained in the predetermined step as an index. Consequently, it is possible to suppress a change in the detection sensitivity due to the resistance value change of the sensor electrodes by calculating a correction value of sensitivity. The sensitivity correcting method in this embodiment is desirably executed periodically, for example, at an interval of several month or one year. However, the sensitivity correction method may be executed when a power supply is turned on.

A more specific configuration of the touch panel-integrated liquid crystal display device in the embodiment of the invention is explained below.

Figure 12:
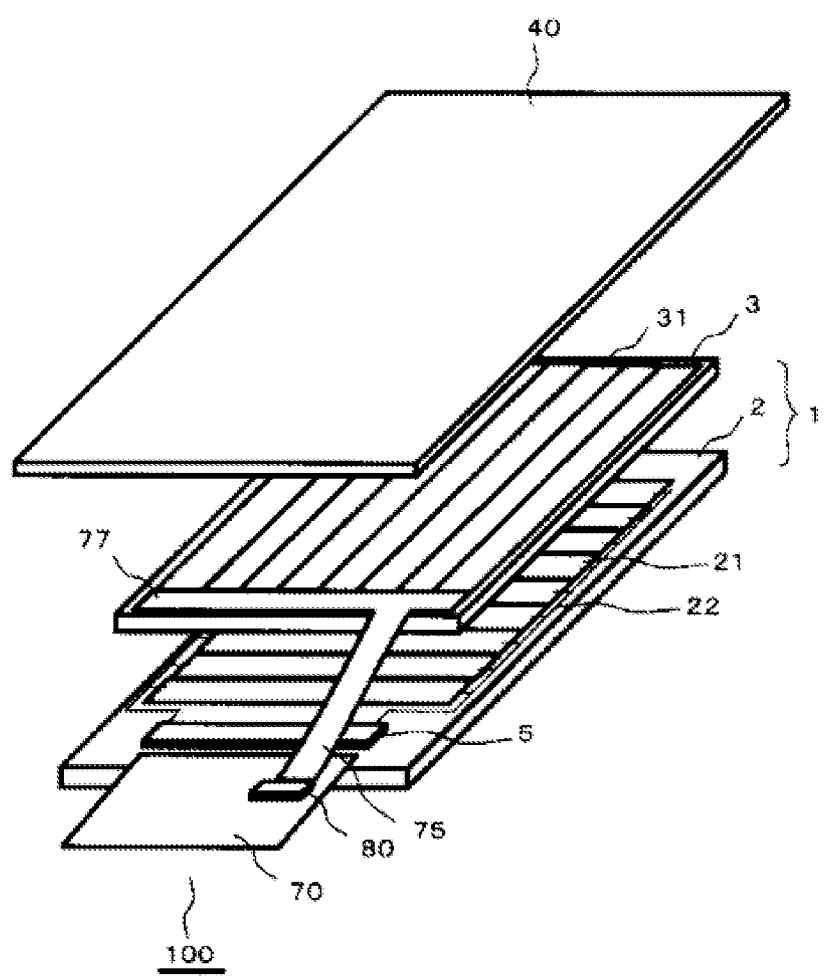
FIG. 12 is a perspective view of a more specific configuration of a touch panel-integrated liquid crystal display device in the embodiment of the invention.

FIG. 12 is a perspective view showing the more specific configuration of the touch panel-integrated liquid crystal display device in the embodiment of the invention. A liquid crystal display device 100 shown in FIG. 12 includes a liquid crystal display panel 1, a driving circuit 5, a flexible board 70, a front panel 40, a storage case (not shown in the figure), and a backlight (not shown in the figure).

The liquid crystal display panel 1 includes a TFT substrate 2 and a color filter substrate 3. The TFT substrate 2 and the color filter substrate 3 are superimposed one on top of the other a predetermined space apart from each other. Both the substrates are bonded together by a seal material (not shown in the figure) provided in a frame shape in the vicinity of the peripheral edge portion between the substrates. A liquid crystal composition is encapsulated and sealed on the inner side of the seal material. A sheet polarizer is bonded to the outer side of both the substrates.

On the TFT substrate 2, counter electrodes 21 and a counter electrode signal line 22 connected from the driving circuit 5 to the counter electrodes 21 are provided. A counter electrode signal is transmitted from the driving circuit 5 to the counter electrodes 21 via the counter electrode signal line 22. Detection electrodes 31 (the X electrodes 201 shown in FIGS. 4A and 4B) are provided on the color filter substrate 3. The detection electrodes 31 are connected to a flexible board 75 by a connecting section 77. The flexible board 75 is connected to the flexible board 70 by a connector 80. A detection signal from the detection electrode 31 is transmitted to the driving circuit 5 via the flexible board 75, the connector 80, and the flexible board 70.

The liquid crystal display panel 1 includes a display unit including a large number of pixels in a matrix shape. The counter electrodes 21 are arranged to be opposed to pixel electrodes in pixels. When a voltage is applied between the electrodes, the orientation of liquid crystal molecules changes. According to the change in the orientation of the liquid crystal molecules, the transmittance of light changes, whereby an image is displayed.

Figure 13:
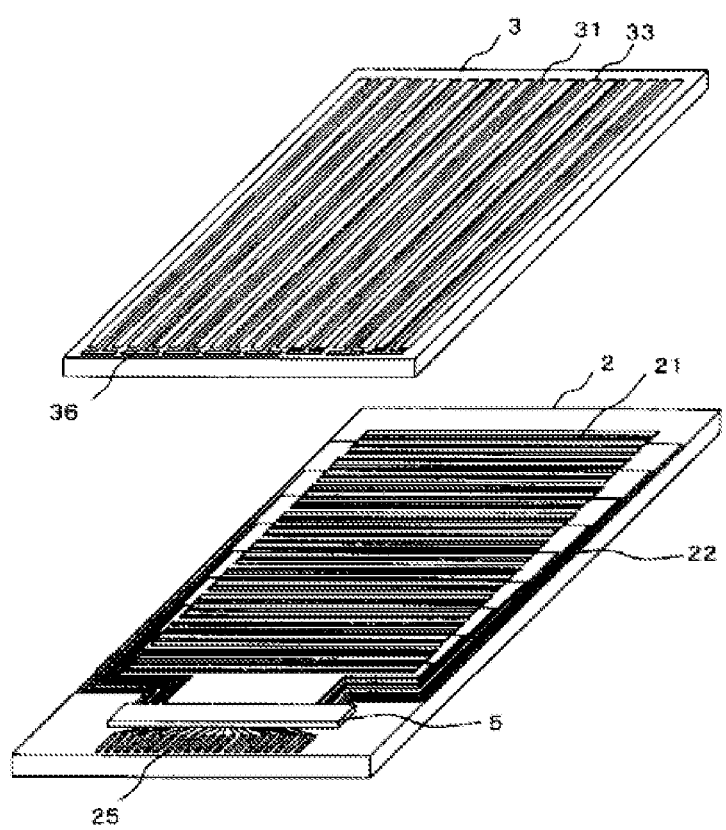
FIG. 13 is a diagram for explaining counter electrodes and detection electrodes in the touch panel-integrated liquid crystal display device shown in FIG. 12.

The counter electrodes 21 and the detection electrodes 31 of the liquid crystal display device 100 shown in FIG. 12 are explained with reference to FIG. 13.

As explained above, the counter electrodes 21 are provided on the TFT substrate 2. A plurality of (e.g., about twenty) counter electrodes 21 are connected in common at both ends and connected to the counter electrode signal line 22. A counter electrode signal is supplied from the driving circuit 5 to the bundle-like counter electrodes 21.

In the liquid crystal display device 100 shown in FIG. 12, the bundle-like counter electrodes 21 function as the Y electrodes 202 shown in FIGS. 4A and 4B as well and configure the scanning electrodes in the invention. The detection electrodes 31 correspond to the X electrodes 201 shown in FIGS. 4A and 4B and configure the detection electrode in the invention.

Therefore, the counter electrode signal includes a counter voltage used for image display and a driving signal (the input pulse voltage shown in FIG. 7A) used for detection of a touch position. When the driving signal is applied to the counter electrodes 21, a detection signal is generated in the detection electrodes 31 arranged at a fixed space from the counter electrodes 21 to form capacitance. The detection signal is extracted to the outside via terminals for detection electrodes 36.

Dummy electrodes 33 are formed on both sides of the detection electrodes 31. The detection electrodes 31 expand toward the dummy electrodes 33 side at one ends and form the terminals for detection electrodes 36 having a T-shape. On the TFT substrate 2, besides the counter electrode signal line 22, various wires, terminals, and the like such as an input terminal for driving circuit 25 are formed.

Figure 14:
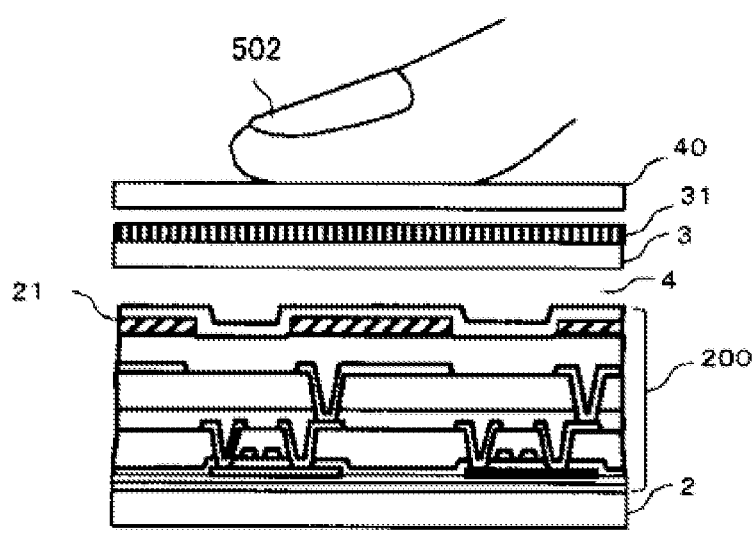
FIG. 14 is an enlarged schematic sectional view of a part of a cross section of a display unit of the touch panel-integrated liquid crystal display device shown in FIG. 12.

A partially enlarged schematic sectional view of the cross section of the display unit in the liquid crystal display device 100 shown in FIG. 12 is shown in FIG. 14.

As shown in FIG. 14, a pixel unit 200 is provided on the TFT substrate 2. The counter electrodes 21 are used for image display as apart of pixels. A liquid crystal composition 4 is held between the TFT substrate 2 and the color filter substrate 3. The detection electrodes 31 provided on the color filter substrate 3 and the counter electrodes 21 provided on the TFT substrate 2 form capacitance. When a driving signal is applied to the counter electrodes 21, the voltage of the detection electrodes 31 changes.

At this point, as shown in FIG. 14, when a conductor such as a finger is brought close to or into contact with the front panel 40, a change occurs in the capacitance and a change occurs in the voltage generated in the detection electrode 31 compared with a voltage generated when the conductor is not brought close to or into contact with the front panel 40.

In this way, the change in the capacitance generated between the counter electrodes 21 and the detection electrodes 31 formed on the liquid crystal display panel 1 is detected. Consequently, it is possible to provide a function of a touch panel in the liquid crystal display panel 1.

As explained above, according to this embodiment, it is possible to suppress a change in the detection sensitivity due to a resistance value change of the sensor electrodes (the X electrodes 201 shown in FIGS. 4A and 4B). Therefore, it is possible to allow resistance value fluctuation in the sensor electrodes. Consequently, since a baking step for ITO films included in the sensor electrodes can be omitted, it is possible to realize a reduction in costs.

The invention devised by the inventor is specifically explained above on the basis of the embodiment. However, the invention is not limited to the embodiment. It goes without saying that various changes are possible without departing from the spirit of the invention.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display device comprising:
   a display panel; and
   a touch panel built in the display panel, wherein
   the touch panel includes:
      a plurality of scanning electrodes formed on the display panel;
      a plurality of detection electrodes formed on the display panel and crossing the plurality of scanning electrodes;
      a driving-signal supplying unit configured to input a driving signal to the scanning electrodes when a touch position detection is performed;
      a detecting unit configured to acquire detection signals from the detection electrodes when the driving signal is input to the scanning electrodes from the driving-signal supplying unit; and
      a sensitivity correcting unit configured to correct sensitivity of the touch panel, and
   the sensitivity correcting unit includes:
      a difference acquiring unit configured to acquire a signal difference (S1−S2) between a detection signal S1 acquired by the detection electrodes when a driving signal V1 is input to the scanning electrodes from the driving-signal supplying unit and a detection signal S2 (S1>S2) acquired by the detection electrodes when a driving signal V2 (V1>V2) different from the driving signal V1 is input to the scanning electrodes from the driving-signal supplying unit; and a parameter changing unit configured to change parameters of at least one of the driving-signal supplying unit and the detecting unit when the signal difference (S1−S2) is equal to or smaller than a predetermined threshold D.

2. The display device according to claim 1, wherein the parameter changing unit increases a voltage value of the driving signal input to the scanning electrodes from the driving-signal supplying unit when the touch position detection is performed.

3. The display device according to claim 1, wherein the parameter changing unit increases a detection time in which the detecting unit acquires the detection signals from the detection electrodes when the touch position detection is performed.

4. The display device according to claim 1, wherein
the driving-signal supplying unit inputs the driving signal to the scanning electrodes a plurality of times when the touch position detection is performed, and
the parameter changing unit increases a number of times of input of the driving signal input to the scanning electrodes from the driving-signal supplying unit when the touch position detection is performed.

5. The display device according to claim 4, wherein the detecting unit accumulates respective detection signals input to the scanning electrodes a plurality of times and detects the detection signal when the touch position detection is performed.

6. The display device according to claim 1, wherein the correction of the sensitivity of the touch panel by the sensitivity correcting unit is periodically executed.

7. The display device according to claim 1, wherein the plurality of scanning electrodes and the plurality of detection electrodes are formed on different surfaces.

8. The display device according to claim 1, wherein
one of the plurality of scanning electrodes and the plurality of detection electrodes are formed on a surface of the display panel on an observer side, and
the other of the plurality of scanning electrodes and the plurality of detection electrodes are formed on an inside of the display panel.

9. The display device according to claim 1, wherein
the display panel is a liquid crystal display panel including a first substrate, a second substrate, and a liquid crystal layer held between the first substrate and the second substrate,
the second substrate is arranged on an observer side,
one of the plurality of scanning electrodes and the plurality of detection electrodes are formed on a surface of the second substrate on an opposite side of the liquid crystal layer, and
the other of the plurality of scanning electrodes and the plurality of detection electrodes are formed on a surface of the first substrate on the liquid crystal layer side.

10. The display device according to claim 1, wherein the plurality of scanning electrodes and the plurality of detection electrodes are stripe electrodes.

* * * * *